United States Patent Office 2,870,105
Patented Jan. 20, 1959

2,870,105

NITRILE RUBBER COMPOSITIONS CONTAINING SULFURIZED TALL OIL

Eric O. Ridgway, Scotch Plains, and Newell A. Perry, Hamilton Square, N. J., assignors to Ridbo Laboratories, Inc., Trenton, N. J., a corporation of New Jersey No Drawing. Application July 31, 1953
Serial No. 371,789

3 Claims. (Cl. 260—23.7)

This invention relates to cured and uncured synthetic rubber compositions containing polymers made of butadiene and acrylonitrile and to the compounding thereof.

The butadiene-acrylonitrile copolymers are elastomeric and are collectively known as nitrile rubbers. There are several types of nitrile rubbers. The types differ chiefly with respect to the ratios of the butadiene and acrylonitrile which are copolymerized. This invention is particularly directed to those elastomers whose major component is a butadiene-acrylonitrile copolymer, and mixtures thereof with other elastomers.

The nitrile rubbers vulcanize in a manner similar to natural rubber and are generally compounded with various pigments, fillers and the like to impart desired characteristics to the vulcanizate. They possess many desirable for a wide variety of uses. For example, the nitrile rubbers withstand the effects of aging, abrasion and heat better than natural rubbers. They exhibit a high degree of "nerve" (the ability of the elastomers to recover after being stretched, compressed, distorted or otherwise subjected to stresses ad strains), they show outstanding resistance to solvents and oils in general, bth with respect to solvent action and swelling.

At the same time some of these desirable characteristics are of such nature as to make the processing and compounding of the nitrile rubbers difficult and expensive operations. This, therefore, prevents utilization of such rubbers in many of the applications for which they are particularly well suited. To illustrate, the nervy characteristic of the nitriles and their inertness to solvent action are factors which contribute to the so-called "shortness" of most compounded nitrile rubber mixes.

In the present application, the terms "length" and "shortness" are used respectively to mean relatively good cohesive strength and relatively poor cohesive strength in the uncured or unvulcanized stock. Many factors have a bearing on whether or not a particular stock will be "long" or "short."

For example, the nerve of the rubber base is one of the factors which will, to some extent, determine the length of the stock.

The nitrile rubbers are exceptionally high in nerve and do not readily masticate or plasticize on milling so as to enable the uniform dispersion of the various solid compounding ingredients therein. Therefore, efforts have been made to utilize various softeners and plasticizers for the nitrile rubbers which permit uniform dispersion of the necessary pigments, fillers, etc.

However, the characteristic oil resistance of the nitrile rubbers presents an obstacle to the incorporation of many of the usual rubber plasticizers and softeners. The reason for this is that many of the usual rubber plasticizers and softeners have oily characteristics and therefore the incorporation thereof in the nitrile rubbers is resisted by one of the very characteristics which makes these rubbers of special use for many commercial purposes. In these circumstances the usual rubber compounding techniques, especially with respect to plasticizing, are not well adapted to the nitrile rubbers.

One of the principal objects of the present invention is to provide a nitrile rubber compound in which the compounding ingredients can be uniformly dispersed and which at the same time will tend to lengthen the stock.

Another important disadvantage of the nitrile rubbers is their substantial lack of building tack. The butadiene styrene copolymers exhibit a low order of building tack which is not considered to be satisfactory, but the building tack of the nitrile rubbers is even lower. In order to construct rubber goods in which layers of rubber impregnated fabrics, sheeted stocks, etc., must adhere to each other and must be built up or plied on each other, the uncured stocks must possess a certain degree of tack or stickiness. Examples of this type of article are mechanical belts, tire carcasess and the like. Poor building tack interferes with efficient manufacture of such products and the cured or finished products produced from low tack stocks are undesirable in that the layers tend to part with usage. The parting will be in proportion to the poorness of the building tack.

A degree of building tack is inherent in some elastomers, notably in natural rubber. Where needed, building tack can be developed by the addition of so-called tackifiers. These agents, however, owe their behavior, at least in part, to their ability to be partially or completely absorbed by the elastomer base. In the case of the inherently non-tacky nitrile rubbers their very high oil resistance and resistance to swelling, inhibits the absorption of tackifiers in quantities necessary to develop a desirable degree of building tack.

As in natural rubber, stearic acid is commonly used in nitrile rubber compounds to assist the formation of soluble zinc necessary for the cure. However, stearic acid is a highly non-tacky material and it further aggravates the undesirable non-tackiness of nitrile rubbers. Stearic acid also acts as a lubricant and tends to bloom or come to the surface of the rubber. This migration is caused by its incompatibility with the elastomer.

In view of the above it is a further object of this invention to obtain a new composition of matter with improved building tack in the uncured state by incorporating into nitrile rubbers and compositions containing the same, an agent capable of replacing anti-tack stearic acid and which will also produce soluble zinc in the compound desired for curing of the nitrile rubbers. This effectively increases building tack by virtue of the elimination of a non-tack agent.

We have found that the above purposes, including especially lengthening of the compound by reducing nerve and improving dispersion of ingredients, and the effective increase of the building tack of nitrile rubbers, are achieved by the employment of an agent comprising the reaction product of tall oil and sulfur, which may be prepared in the manner more fully described hereinafter; this agent will usually be referred to as sulfurized tall oil.

The incorporation of the sulfurized tall oil reaction product in nitrile rubbers produces greater homogeneity of the mix. This permits better processing thereof, particularly processing on calenders and by extruders.

The tall oil-sulfur reaction product is highly compatible with the nitrile rubbers over a wide range of proportions. The quantity of the tall oil-sulfur reaction product to be used will vary somewhat according to the particular formulation being prepared and the properties desired in a particular batch or in the uncured compound or in the ultimately cured product, but in general quantities ranging from at least 2% up to about 25% calculated by weight on the basis of the nitrile rubber present are useable. For most purposes, a range of about 2% to 12% will give good results.

The sulfurized tall oil reaction product can be incorporated directly and rapidly into such rubbers so that pre-mastication with essentially good plasticization is thereby made possible. In this way, the nerve of the nitrile rubber is reduced and the dispersion of the pigments and the other ingredients in the mix may be greatly improved. Even when the sulfurized tall oil reaction product is added with the pigments, replacing all or part of commonly used softeners and/or plasticizers, its high compatibility with the nitrile rubbers allows it to enter the elastomers and be absorbed. It thereby reduces the nerve of the elastomers and increases the length of the mix and in so doing it increases the ability of the mix to disperse any agglomerates that might be present.

While the sulfurized tall oil per se is not a tackifier or lubricant, it appears to enhance the value of tackifiers used in its presence. It is also capable of producing soluble zinc and therefore may replace anti-tack stearic acid. The complete or partial removal of stearic acid from stocks containing sulfurized tall oil will tend to improve the building tack of the compound. Still better building tack can be obtained by replacing the stearic acid which has been removed with an equal quantity of a tackifier without impairing the desirable physical qualities of the nitrile rubbers.

Another object of the present invention is to provide a method for masterbatching of nitrile rubbers. This is accomplished in accordance with the present invention by forming a homogeneous masterbatch of the nervy nitrile rubber with the sulfurized tall oil which plasticizes the nitrile and reduces nerve.

The sulfurized tall oil can be intermixed with the nitrile rubbers in conventional rubber mixing equipment, and it will be incorporated more readily than the usual plasticizers.

Regardless of the manner in which the sulfurized tall oil is incorporated with the nitrile elastomers, the advantages described herein will be obtained in the resulting compound or composition.

When the sulfurized tall oil is employed according to the present invention, it not only accomplishes these objects without impairing the desirable properties of the nitrile rubber, but still further, in many instances, it will result in advantageous changes and improvements in the properties of both the cured and uncured nitrile rubber which will permit an even wider range of use thereof.

The nitrile rubbers containing sulfurized tall oil are very compatible with other elastomers, such as, natural rubber, butadiene-styrene copolymers, chloroprene rubbers and reclaims thereof.

The tall-oil sulfur reaction product contemplated for use according to the invention is prepared as follows:

First note that tall oil, which is a by-product of the manufacture of paper, comprises a mixture of fatty acids and rosin acids in roughly equal proportions, together with from about 3% to about 15% of unsaponifiables, including sterols, hydrocarbons, etc. The tall oil employed may be the crude by-product or may be a refined product, the latter being advantageous where white or light shades of colors are desired in the final vulcanized rubber or rubber product being produced.

The tall oil is heated together with from about 1% to 25% of sulfur, most advantageously from about 6% to 10%, the temperature of heating being between about 300° F. and 400° F., preferably in the neighborhood of 310° F. to 330° F. The time of heating should be continued until no free sulfur remains.

The desirable characteristics of the sulfurized product are apparently due to the content of fatty acids and rosin acids in the material employed for sulfurization. Therefore, it is advantageous in the heating of the tall oil with the sulfur to avoid severe time-temperature relationships (especially excessively high temperatures), because such severe treatment tends to decarboxylate rosin acids present and excessively increase the hydrocarbon or unsaponifiable content.

The sulfurized tall oil product comprises a homogeneous, highly viscous mass at room temperatures; and it is of a sticky consistency having a high affinity for rubbers of the kinds enumerated.

EXAMPLES

There are presented just below a number of examples, most of which are given in comparative groups or pairs, so as to illustrate various of the features and advantages hereinbefore discussed.

To simplify the presentation of the examples and to enable tabulation of the data, there is given just below a statement fully identifying treatment conditions, testing results, and materials used in the examples and referred to therein only briefly or by identifying letters or figures for simplicity.

Considering first of the materials used in the examples, note the following:

STO—wherever this symbol appears in the examples, sulfurized tall oil is meant. In all of the examples the sulfurized tall oil was prepared in the following manner: Crude tall oil was heated at a temperature of about 320° F. with about 8 to 10% of sulfur for about 3 to 4 hours.

The rubbers used in the various examples are identified as follows:

Paracril BJ—a butadiene-acrylonitrile copolymer manufactured by the Naugatuck Chemical Division of the U. S. Rubber Co. Mooney viscosity upwards of ML-4 50.

Hycar OR 25—a modified butadiene-acrylonitrile copolymer manufactured by the B. F. Goodrich Chemical Company.

Hycar 1042—modified butadiene-acrylonitrile copolymer manufactured by the B. F. Goodrich Chemical Company.

Pale crepe—light colored natural rubber.

S. S.—smoked sheets of natural rubber.

Softeners and plasticizers used in the various examples may be identified as follows:

Circo light oil—a light petroleum processing oil, predominantly paraffinic, made by Sun Oil Co.

Cumar MH 2½—a medium hard polymer of indene-cumarone and associated coal tar compounds made by the Barrett Division of Allied Chemical and Dye Corp.

Amalgamator Z 4—a thermoplastic polyester resin plasticizer made by the Tyson Corporation, Woodbridge, N. J.

Neophax A—a brown vulcanized vegetable oil made by the Stamford Rubber Supply Company.

Velsicol GE-9—a solid thermoplastic hydrocarbon, color 20-22 on the coal tar scale, made by Velsicol Corp. (Division of Arvey Corp.)

Fillers and pigments used in the various examples may be identified as follows:

Hard clay—kaolin or china clay of relatively fine particle size. An example "Dixie Clay" a brand supplied by R. T. Vanderbilt Co.

Rayox—titanium dioxide supplied by R. T. Vanderbilt Co.
Hi-Sil—fine particle sized silica made by Columbia-Southern Chemical Corp.
Philblack A—a medium abrasive furnace carbon black made by the Phillips Petroleum Co.
Atomite—a brand of natural ground calcium carbonate sold by Thompson-Weinman Co.

Accelerators used in the various examples may be identified as follows:
Altax—benzothiazyl disulfide, brand name supplied by R. T. Vanderbilt Co.
Amax—n-oxydiethylene benzothiazole - 2 - sulfenamide, brand supplied by R. T. Vanderbilt Co.
Methyl tuads—a tetra methyl thirum disulfide.

The antioxidant used in the various examples may be identified as follows:

Antioxidant 2246—2-2'-methylene-bis (4-methyl-6-tertiarybutyl phenol) made by the Calco Division of the American Cyanamid Co.

Conditions of treatment, test results, etc. are identified as follows:

Wherever cures are mentioned, they represent vulcanization treatments at the times indicated in minutes at a temperature of about 290° F.

All modulus and tensile figures are given in pounds per square inch.

All hardness figures are determined on the Shore A scale.

The Mooney viscosity figures are identified in the examples by "ML" or "MS" according to whether the determination is made with a large or small rotor. In all instances, the determinations were made at 212° F. The time in minutes of the Mooney test is also indicated by the numeral following the letters "ML" or "MS".

The Mooney scorch figures given in the examples represent time in minutes required to raise the viscosity 5 points above the lowest point of viscosity reached during the test. In all cases these determinations were made at 250° F.

In all of the examples the parts indicated are by weight.

*Examples 1 to 4*

The following examples illustrate the use of sulfurized tall oil in plasticizing butadiene acrylonitrile rubber.

On a cold mill the nitrile rubber was nervy, did not band easily and was full of holes. But with 5 or 10 parts of sulfurized tall oil on 100 parts of rubber proper banding was obtained.

On a hot mill (with steam heated rolls) nitrile rubber alone would band only after long continued milling, but with 5 or 10 parts of sulfurized tall oil, it quickly softened and was easily handled.

|  | Example 1 | Example 2 | Example 3 | Example 4 |
|---|---|---|---|---|
| Paracril BJ | 100 | 100 | 100 | 100. |
| STO | | 5 | 10 | |
| Circo light oil | | | | 5. |

| Viscosities ML-4 | | | | |
|---|---|---|---|---|
| Cold Mill | 47½ | 41½ | 32½ | Incompatible. |
| Hot remill on steam-heated rolls (300° F.) | 41 | 35 | 31½ | Do. |

The Mooney viscosities definitely show the plasticizing and smoothing-out effects of the sulfurized tall oil, even on hot re-milling. Comparison of Examples 2 and 3 with Example 4 demonstrates the striking contrast between the compatibility of the sulfurized talloil and the incompatibility of one of the usual softeners. While the Circo light oil used in Example 4 is readily incorporated in various other rubbers, the oil resistance of the nitrile rubber is responsible for the incompatibility here.

*Examples 5 and 6*

These examples compare the rate of incorporation of sulfurized tall oil with nitrile rubber with that of a relatively expensive plasticizer often employed for this purpose.

|  | Example 6 | Example 6 |
|---|---|---|
|  | Parts | Parts |
| Paracril BJ | 100 | 100 |
| Dibutyl phthalate | 10 | |
| STO | | 10 |
| Total | 110 | 110 |
| Time of incorporation minutes | 8 | 4 |
| ML-4 | 27½ | 31 |

*Examples 7 to 10*

These examples illustrate the use of sulfurized tall oil in nitrile-natural rubber belt compounds. Not only does the sulfurized tall oil inhibit the shortness and thus improve processing of such stocks, but also the generally desirable physical characteristics are greatly improved.

All of these examples were made from the same basic batch, which is Example 7. Example 8 contained 10 more parts of dibutyl phthalate blended on a factory warm-up roll mill. Example 9 contained 10 parts of sulfurized tall oil blended on the same factory warm-up roll mill. Example 10 is a blend of equal parts of Example 8 and 9 blended on laboratory roll mill.

|  | Example 7 | Example 8 | Example 9 | Example 10 |
|---|---|---|---|---|
| Hycar OR 25 | 95 | 95 | 95 | 95 |
| Pale crepe | 5 | 5 | 5 | 5 |
| Cumar MH 2½ | 10 | 10 | 10 | 10 |
| Amalgamator Z4 | 10 | 10 | 10 | 10 |
| Hard clay | 40 | 40 | 40 | 40 |
| Rayox | 25 | 25 | 25 | 25 |
| Zinc oxide | 5 | 5 | 5 | 5 |
| Stearic acid | 1 | 1 | 1 | 1 |
| Amax | 1.75 | 1.75 | 1.75 | 1.75 |
| Altax | .25 | .25 | .25 | .25 |
| Santo white crystals | 1 | 1 | 1 | 1 |
| Sulfur | 2.5 | 2.5 | 2.5 | 2.5 |
| Dibutyl phthalate | 10 | 20 | 10 | 15 |
| STO | | | 10 | 5 |
| Totals | 206.5 | 216.5 | 216.5 | 216.5 |
| Cures at 30 minutes: | | | | |
| Hardness | 51 | 50 | 60 | 50 |
| Modulus at 200% | 275 | 175 | 340 | 175 |
| Modulus at 400% | 500 | 375 | 560 | 340 |
| Tensile strength | 1,530 | 600 | 1,460 | 1,200 |
| Percent elongation | 840 | 520 | 780 | 780 |

The control (Example 7) would not process properly on a calender because of the shortness—the stock would not readily band and developed cracks after skimming onto fabric. In Example 8 where 10 parts more of dibutyl phthalate plasticizer were added, the physicals were very undesirably reduced. However, in Example 9 where 10 parts of sulfurized tall oil were added, a good processing stock was obtained, with all the desirable physicals retained. To be noted is that these were obtained by extending the compound with 10 parts of sulfurized tall oil over the control. Example 10 (a blend of Examples 8 and 9) shows that even 5 parts of sulfurized tall oil greatly improved the compound.

*Examples 11 and 12*

These examples illustrate the use of sulfurized tall oil in a white nitrile rubber belt skim stock, with and without stearic acid in the formula.

|  | Example 11 | Example 12 |
|---|---|---|
| Nitrile rubber | 100 | 100 |
| STO | 5 | 5 |
| Stearic acid | 1 | None |
| Hi-Sil | 20 | 20 |
| Hard clay | 15 | 15 |
| Zinc oxide | 5 | 5 |
| Titanium dioxide | 30 | 30 |
| Antioxidant 2246 | 1 | 1 |
| Amax | 1.75 | 1.75 |
| Altax | .25 | .25 |
| Dibutyl phthalate | 15 | 15 |
| Sulfur | 2.5 | 2.5 |
| Total | 196.5 | 195.5 |

The uncured stock of Example 12 had more building tack than Example 11, and the production of soluble zinc for cure activation was effectively accomplished by the sulfurized tall oil. The building tack can be improved to a still greater degree by adding 1 part of a tackifier such as a cumarone-indene resin to Example 12 to replace the stearic acid removed, and the other desired physicals retained.

*Examples 11 and 12*

HARDNESS

|  | Example 11 | Example 12 |
|---|---|---|
| 15 | 51 | 58 |
| 30 | 59 | 61 |
| 45 | 60 | 62 |
| 60 | 60 | 62 |

MODULUS AT 200%

|  |  |  |
|---|---|---|
| 15 | 150 | 275 |
| 30 | 300 | 375 |
| 45 | 350 | 400 |
| 60 | 375 | 400 |

MODULUS AT 400%

|  |  |  |
|---|---|---|
| 15 | 250 | 540 |
| 30 | 675 | 800 |
| 45 | 800 | 875 |
| 60 | 800 | 940 |

TENSILE STRENGTH

|  |  |  |
|---|---|---|
| 15 | 1,200 | 1,600 |
| 30 | 1,130 | 1,450 |
| 45 | 1,375 | 1,225 |
| 60 | 1,200 | 1,140 |

PERCENT ELONGATION

|  |  |  |
|---|---|---|
| 15 | 810 | 650 |
| 30 | 500 | 510 |
| 45 | 500 | 460 |
| 60 | 480 | 440 |

To be noted are the increased hardness, modulus and tensile values with good retention of elongation, in Example 12 where the stearic acid was left out of the formula.

*Examples 13 to 15*

Base formula, parts
Paracril BJ _____ 75
SS _____ 25
Neophax A _____ 20
Cumar MH 2½ _____ 5
Philblack A _____ 40
Atomite _____ 30
Petrolatum _____ 4
Zinc oxide _____ 5
Altax _____ 1
Stearic acid _____ 1
Circo light oil _____ 15
Sulfur _____ 2.7
    Total _____ 224.7

The above was a factory mix and, as such, is the control, Example 13. In Example 14, 5 parts of sulfurized tall oil were added and mixed. In Example 15, 10 parts of sulfurized tall oil were added and mixed. It will be noted that the basic recipe already has a considerable amount of plasticizers and softeners (46 parts); yet the additional dilution with 5 and 10 parts of sulfurized tall oil, respectively, in Examples 14 and 15, did not greatly reduce the overall physical values, as would be expected by dilution with other commonly used plasticizers or softeners. This is due to the ability of sulfurized tall oil to increase length through improved pigment dispersion.

|  | Example 13 | Example 14 | Example 15 |
|---|---|---|---|
| Relative viscosity | 11½ | 9½ | 9 |
| Scorch | 18¼ | 23½ | 26½ |

HARDNESS

|  |  |  |  |
|---|---|---|---|
| 15 | 49 | 48 | 50 |
| 30 | 52 | 53 | 51 |
| 45 | 54 | 54 | 54 |
| 60 | 54 | 55 | 55 |

MODULUS AT 200%

|  |  |  |  |
|---|---|---|---|
| 15 | 275 | 140 | 150 |
| 30 | 360 | 300 | 230 |
| 45 | 450 | 360 | 330 |
| 60 | 500 | 400 | 360 |

MODULUS AT 400%

|  |  |  |  |
|---|---|---|---|
| 15 | 600 | 350 | 400 |
| 30 | 940 | 750 | 575 |
| 45 | 1,200 | 1,000 | 850 |
| 60 | 1,275 | 1,075 | 975 |

TENSILE STRENGTH

|  |  |  |  |
|---|---|---|---|
| 15 | 800 | 500 | 600 |
| 30 | 1,175 | 1,000 | 800 |
| 45 | 1,350 | 1,100 | 1,000 |
| 60 | 1,360 | 1,160 | 1,130 |

PERCENT ELONGATION

|  |  |  |  |
|---|---|---|---|
| 15 | 510 | 570 | 570 |
| 30 | 480 | 480 | 520 |
| 45 | 460 | 440 | 470 |
| 60 | 440 | 440 | 440 |
| Specific gravity | 1.17 | 1.17 | 1.17 |

*Examples 16 and 17*

These compare the physical results of using a conventional plasticizer and sulfurized tall oil in a nitrile rubber formula.

Basic formula
Hycar 1042 _____ 100
Zinc oxide _____ 5
Philblack A _____ 40
Methyl tuads _____ 3.5
Stearic acid _____ 1
    Total _____ 149.5

In Example 16, 10 parts of Velsicol GE-9 were used as the plasticizer. In Example 17, 10 parts of sulfurized tall oil were used.

HARDNESS

|  | Example 16 | Example 17 |
|---|---|---|
| 15 | 63 | 67 |
| 30 | 63 | 70 |
| 45 | 64 | 69 |

MODULUS AT 300%

| | | |
|---|---|---|
| 15 | 900 | 1,700 |
| 30 | 1,000 | 1,800 |
| 45 | 950 | 1,800 |

TENSILE STRENGTH

| | | |
|---|---|---|
| 15 | 2,650 | 3,000 |
| 30 | 2,750 | 2,800 |
| 45 | 2,650 | 2,900 |

PERCENT ELONGATION

| | | |
|---|---|---|
| 15 | 770 | 510 |
| 30 | 720 | 460 |
| 45 | 680 | 460 |

TESTS AFTER AGING 70 HOURS AT 212° F. (30 MINUTE CURE)

| | | |
|---|---|---|
| Ultimate tensile strength | 2,650 | 3,300 |
| Percent ultimate elongation | 660 | 430 |
| Shore hardness | 63 | 65 |
| Percent volume change | −4 | −1 |
| Percent compression set | 39 | 22 |

IMMERSED IN DISTILLED WATER 70 HOURS AT 212° F.

| | | |
|---|---|---|
| Ultimate tensile strength | 2,080 | 2,750 |
| Percent ultimate eleongation | 520 | 430 |
| Shore hardness | 55 | 63 |
| Percent volume change | 13 | 9 |

Example 17 shows consistently improved physicals as compared with the use of Velsicol in Example 16.

We claim:

1. A rubber composition comprising a butadiene-acrylonitrile rubber and the thermal reaction product of tall oil and sulfur, the sulfur in the reaction product being about 1% to 25% by weight based on the weight of the tall oil and the amount of said reaction product being from about 2% to about 25% by weight of the nitrile rubber.

2. A rubber composition comprising a butadiene-acrylonitrile rubber and the thermal reaction product of tall oil and sulfur, the sulfur in the reaction product being about 1% to 25% by weight based on the weight of the tall oil and the amount of said reaction product being from about 2% to about 12% by weight of the nitrile rubber.

3. A vulcanizate comprising a butadiene-acrylonitrile rubber and the thermal reaction product of tall oil and sulfur, the sulfur in the reaction product being about 1% to 25% by weight based on the weight of the tall oil and the amount of said reaction product being from about 2% to about 12% by weight of the nitrile rubber.

References Cited in the file of this patent

UNITED STATES PATENTS 2,480,478  Kalman _____ Aug. 30, 1949

FOREIGN PATENTS 618,592  Germany _____ Sept. 11, 1935

OTHER REFERENCES

"Vinsol," Ad., Ind. Eng. Chem., 39, page 52A, November 1947.

Barron: "Modern Synthetic Rubbers," p. 389, Chapman & Hall (1949).

UNITED STATES PATENT OFFICE
CERTIFICATE OF CORRECTION

Patent No. 2,870,105                                                    January 20, 1959

Eric O. Ridgway et al.

It is hereby certified that error appears in the printed specification of the above numbered patent requiring correction and that the said Letters Patent should read as corrected below.

Column 1, line 29, after "many" insert -- outstanding characteristics which render them highly --; line 35, for "ad" read -- and --; line 37, for "th" read -- both --; column 3, line 9, for "of about" read -- from about --; column 4, line 32, for "symbolt" read -- symbol --; column 5, line 63, in the table, fifth column thereof, opposite "STO" insert leaders; column 6, lines 4 and 15, in the table, second column thereof, for "Example 6" read -- Example --; line 36, for "Example 8" read -- Examples 8 --; column 7, line 72, for the numeral "1" opposite "Stearic acid" read -- 2 --; column 9, line 27, for "eongation" read -- elongation --.

Signed and sealed this 26th day of May 1959.

(SEAL)

Attest:

KARL H. AXLINE                                                        ROBERT C. WATSON
Attesting Officer                                              Commissioner of Patents